(12) United States Patent
Matsubara et al.

(10) Patent No.: US 8,782,079 B2
(45) Date of Patent: Jul. 15, 2014

(54) CONFIGURATION INFORMATION MANAGEMENT DEVICE, DISTRIBUTED INFORMATION MANAGEMENT SYSTEM AND METHOD

(75) Inventors: Masazumi Matsubara, Kawasaki (JP); Hiroshi Otsuka, Kawasaki (JP); Yuji Wada, Kawasaki (JP); Yasuhide Matsumoto, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 153 days.

(21) Appl. No.: 12/972,755

(22) Filed: Dec. 20, 2010

(65) Prior Publication Data

US 2011/0153565 A1  Jun. 23, 2011

(30) Foreign Application Priority Data

Dec. 22, 2009  (JP) .................. 2009-291329

(51) Int. Cl.
*G06F 17/30* (2006.01)
(52) U.S. Cl.
USPC .......................................... 707/770; 707/726
(58) Field of Classification Search
None
See application file for complete search history.

(56) References Cited

U.S. PATENT DOCUMENTS

2010/0115100 A1* 5/2010 Tubman et al. ............... 709/227
2010/0179939 A1* 7/2010 Rangarajan et al. .......... 707/609

FOREIGN PATENT DOCUMENTS

| JP | 2000-250918 | 9/2000 |
|---|---|---|
| JP | 2004-252789 | 9/2004 |
| WO | WO-2009/122527 A1 | 10/2009 |

OTHER PUBLICATIONS

Great Britain Search Report, mailed Apr. 26, 2011 for corresponding Great Britain Application No. 1021564.8.

* cited by examiner

*Primary Examiner* — Ajay Bhatia
*Assistant Examiner* — Miranda Huang
(74) *Attorney, Agent, or Firm* — Fujitsu Patent Center

(57) ABSTRACT

A configuration information management device includes a storage unit for storing a configuration item and an item relationship. The configuration information management device controls to cause the storage unit or the different configuration information management device to store the item relationship. The configuration information management device also controls to cause the storage unit or the different configuration information management device containing a configuration item connected to the item relationship to store a replica of the item relationship. When a search request including a series of the configuration item and the item relationship is accepted, the configuration information management device decomposes the search request such that the configuration item and the item relationship arranged in series are together treated as a unit of processing, and performs a search process for each unit of processing.

7 Claims, 13 Drawing Sheets

FIG.3

```
<item id="Server001" type="Server">
  <record type="observed">
    <name>svr1</name>
    <cpu>XXX</cpu>
    <memory>4GB</memory>
    <ipAddress>192.168.0.1</ipAddress>
    <status>error</status>
    ...
    </Server>
  </record>
</item>
```

```
<item id="Person005" type="Server">
  <record type="observed">
    <name>TARO</name>
    <organization>SECTION A</organization>
    <tel>012-345-6789</tel>
    <email>xxx@foo.bar.baz</email>
    ...
    </Server>
  </record>
</item>
```

```
<relationship id="Rel1" type="ManagedBy">
  <sourceItem>Server001</sourceItem>
  <targetItem>Person005</targetItem>
  <record type="observed">
    <Status>normal</Status>
    ...
  </record>
</relationship>
```

CONFIGURATION INFORMATION MANAGEMENT DEVICE, DISTRIBUTED INFORMATION MANAGEMENT SYSTEM AND METHOD

CROSS-REFERENCE TO RELATED APPLICATION

This application is based upon and claims the benefit of priority of the prior Japanese Patent Application No. 2009-291329, filed on Dec. 22, 2009, the entire contents of which are incorporated herein by reference.

FIELD

The embodiments discussed herein are directed to a configuration information management device, a distributed information management system and a distributed information management method.

BACKGROUND

Open systems and multi-vendor systems have been the recent trends of IT systems, and IT systems have grown in scale and complexity as a result of increasing number of servers and increasing storage volume. This leads not only to higher operational costs but also to frequent occurrence of system shutdown and lower quality service due to human errors. In order to prevent these problems, importance may be placed on management of configuration information of IT systems including servers, storages and applications.

A database, more specifically what is called a configuration management database, is known as a device to manage configuration information of an IT system. The configuration management database stores operations management data of an IT system, and corresponds to a database of operations management middleware.

The operation of a data center requires operations management middleware pieces optimized for corresponding management jobs including server management, network management, service management, and asset management. The operations management middleware pieces include their respective configuration management databases into which configuration information about the corresponding jobs are entered. That is, one configuration management database manages configuration information independently of a different configuration management database. Accordingly, in some cases, access to configuration management databases may be made in respective ways, or the configuration management databases store configuration information in respective formats. Thus, an actual situation is that the configuration management databases cannot be linked with one another without human intervention.

In response, a distributed information management system has been developed that includes a database called FCMDB (federated configuration management database) in which configuration information of various types spreading over a plurality of configuration management databases are virtually integrated. In the distributed information management system with the FCMDB, configuration management databases to be virtually integrated are called MDRs (management data repositories). As an example, a distributed information management system illustrated in FIG. 14 includes a plurality of MDRs and an FCMDB that are connected through a network. FIG. 14 is a diagram illustrating the FCMDB.

The MDRs each manage information such as that about the structure of a device existing in an IT system. The MDRs handle data of respective types and respective amounts. As a specific example, as illustrated in FIG. 14, an MDR 1 manages design information, an MDR 2 manages product information, an MDR 3 manages quality information, and an MDR 4 manages configuration information.

The FCMDB integrates configuration information about one object that is managed separately in the plurality of MDRs, and manages the integrated configuration information. More specifically, the FCMDB manages configuration items (CIs) of an IT system including a device, software and datalog, and relationships between the CIs (hereinafter called "relationships"). In the example of FIG. 14, a CI "C" managed in the FCMDB is integrated data of design information C" stored in the MDR 1, quality information C^ stored in the MDR 3, and configuration information C' stored in the MDR 4.

As described, the FCMDB integrates configuration information about one object that is managed separately in the plurality of MDRs, and manages the integrated configuration information. Accordingly, in all situation of the system operation including application of patches and hardware maintenance, an operator such as a system administrator is allowed to easily understand the overall structure of the IT system by referring to the configuration information virtually integrated by the FCMDB.

A distributed FCMDB system with a plurality of FCMDBs is known that is intended to enhance scalability. In a distributed FCMDB system illustrated in FIG. 15, information in MDRs are distributedly managed in a plurality of FCMDBs, and the plurality of FCMDBs distributedly perform data entry and data search independently of one another. FIG. 15 is a diagram illustrating the distributed FCMDB system.

In this distributed FCMDB system, data is separately entered into each of the FCMDBs in units of CIs and relationships. Data entry is described in detail by using the example illustrated in FIG. 16. FIG. 16 is a diagram illustrating conventional data entry. In the distributed FCMDB system, for entry of data containing three CIs ($CI_1$, $CI_2$ and $CI_3$) and two relationships ($R_1$ and $R_2$) that are connected together, $CI_1$, $R_2$, $CI_3$, $R_1$ and $CI_2$ are entered separately into different FCMDBs as illustrated in FIG. 16.

In the distributed FCMDB system, when one FCMDB accepts a search request from a client terminal, the FCMDB decomposes the search request such that a CI and a relationship contained in the search request are treated as a subquery, and performs a search process thereafter. As illustrated in the example illustrated in FIG. 17, the FCMDB accepts a query formula "%Server[record/status='error']/&ManagedBy/%Person/record/tel" as a search request to "acquire the telephone number of an administrator of a broken-down server."

In this case, the FCMDB decomposes the formula into a subquery 1 "%Server[record/status='error']," a subquery 2 "/&ManagedBy/," and a subquery 3 "%Person/record/tel."

The FCMDB having accepted the search request searches data stored in the FCMDB itself, or data stored in a different FCMDB, and then processes subqueries sequentially. A search process is described next by using the example illustrated in FIG. 16 performed when a query formula "%$CI_2$/&$R_2$/%$CI_3$" is accepted that is a request to search for $CI_3$ having a relationship called $R_2$ with $CI_2$.

An FCMDB having accepted the search request specifies an FCMDB in which $CI_2$ targeted for the search is stored. Then, the FCMDB having accepted the search request communicates with the FCMDB in which $CI_2$ is stored to retrieve $CI_2$ targeted for the search. Next, the FCMDB communicates with other FCMDBs to search for $R_2$ having such a link that the ID of $CI_2$ is designated at one of ends of the link, and then retrieves the ID of $CI_3$ at the opposite end of the link. Then, based on the retrieved ID, the FCMDB having accepted the search request determines an FCMDB in which $CI_3$ is stored, and communicates with this FCMDB to retrieve the data of $CI_3$. Next, the FCMDB having accepted the search request outputs the data of $CI_3$ to the client terminal as a search result.

Patent Document 1: Japanese Laid-open Patent Publication No. 2004-252789

Patent Document 2: Japanese Laid-open Patent Publication No. 2000-250918.

In the technique of the aforementioned distributed FCMDB system, CIs and relationships are entered separately into different FCMDBs. This means that a search process requires frequent communications between FCMDBs, leading to lower processing speed in the search process.

SUMMARY

According to an aspect of an embodiment of the invention, a configuration information management device, includes a configuration information storage unit for distributedly storing a configuration item indicative of information about a target of management, and an item relationship indicative of information about a connection between configuration items independently of a different configuration information management device; a storage controlling unit for, when a request to enter the item relationship is accepted, determining a destination to store the item relationship, and controlling to cause the configuration information storage unit or the different configuration information management device to store the item relationship; a replica storage controlling unit for controlling to cause the configuration information storage unit or the different configuration information management device to store a replica of the item relationship caused to be stored by the storage controlling unit, either the configuration information storage unit or the different configuration information management device containing a configuration item connected to the item relationship; and a search processing unit for, when a search request including a series of the configuration item and the item relationship is accepted, decomposing the search request such that the configuration item and the item relationship arranged in series are together treated as a unit of processing, and performing a search process for each unit of processing.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram illustrating exemplary data of a CI;

DESCRIPTION OF EMBODIMENTS

Preferred embodiments of the present invention will be explained with reference to accompanying drawings.

[a] First Embodiment

Figure 1:
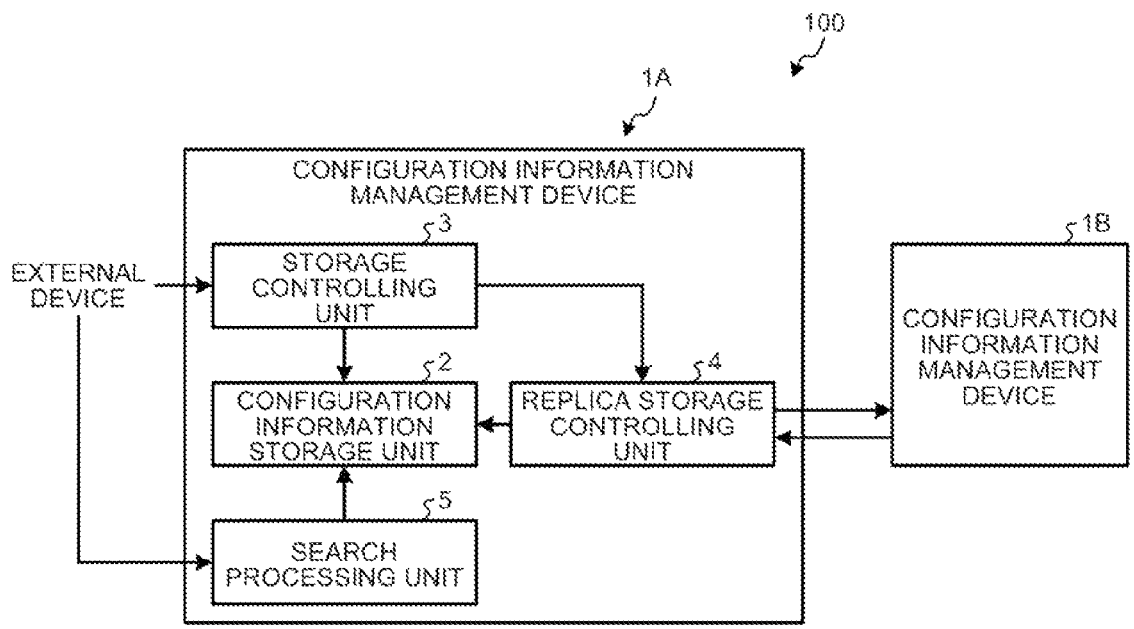
FIG. 1 is a block diagram illustrating the structure of a configuration information management device according to a first embodiment.

First, the structure of a configuration information management device according to a first embodiment will be described by using FIG. 1. FIG. 1 is a block diagram illustrating the structure of the configuration information management device according to the first embodiment. As illustrated in FIG. 1, a distributed information management system 100 includes a plurality of configuration information management devices 1A and 1B that are connected to each other. The configuration information management device 1A includes a configuration information storage unit 2, a storage controlling unit 3, a replica storage controlling unit 4, and a search processing unit 5.

The configuration information storage unit 2 stores a configuration item indicative of information about a target of management, and an item relationship indicative of information about a connection between configuration items independently of the other configuration information management device 1B. When a request to enter an item relationship is accepted, the storage controlling unit 3 determines a destination to store the item relationship, and controls to cause the configuration information storage unit 2 or the configuration information management device 1B to store the item relationship.

The replica storage controlling unit 4 controls to cause the configuration information storage unit 2 or the other configuration information management device 1B, either of which contains a configuration item connected to the item relationship caused to be stored by the storage controlling unit 3, to store a replica of the item relationship. When a search request including a series of a configuration item and an item relationship is accepted, the search processing unit 5 decomposes the search request such that the configuration item and the item relationship arranged in series are together treated as a unit of processing, and performs a search process for each unit of processing.

That is, in the distributed information management system 100, a replica of an item relationship is placed in a configuration information management device in which a configuration item connected to the item relationship is stored. Thus, a configuration item and an item relationship connected to each other are retrieved from that single device in a search process, so that a processing speed in the search process is increased.

As described above, the configuration information management device 1A includes the configuration information storage unit 2 that stores a configuration item indicative of information about a target of management, and an item relationship indicative of information about a connection between configuration items independently of a different configuration information management device. When a request to enter an item relationship is accepted, the configuration information management device 1A determines a destination to store the item relationship, and controls to cause the configuration information storage unit 2 or the different configuration information management device to store the item relationship. Then, the configuration information management device 1A controls to cause the configuration information storage unit 2 or the different configuration information management device, either of which contains a configuration item connected to the item relationship caused to be stored, to store a replica of the item relationship. When a search request including a series of a configuration item and an item relationship is accepted, the configuration information management device 1A decomposes the search request such that the configuration item and the item relationship arranged in series are together treated as a unit of processing, and performs a search process for each unit of processing. Thus, a processing speed in a search process is increased.

[b] Second Embodiment

Structure of FCMDB

Figure 2:
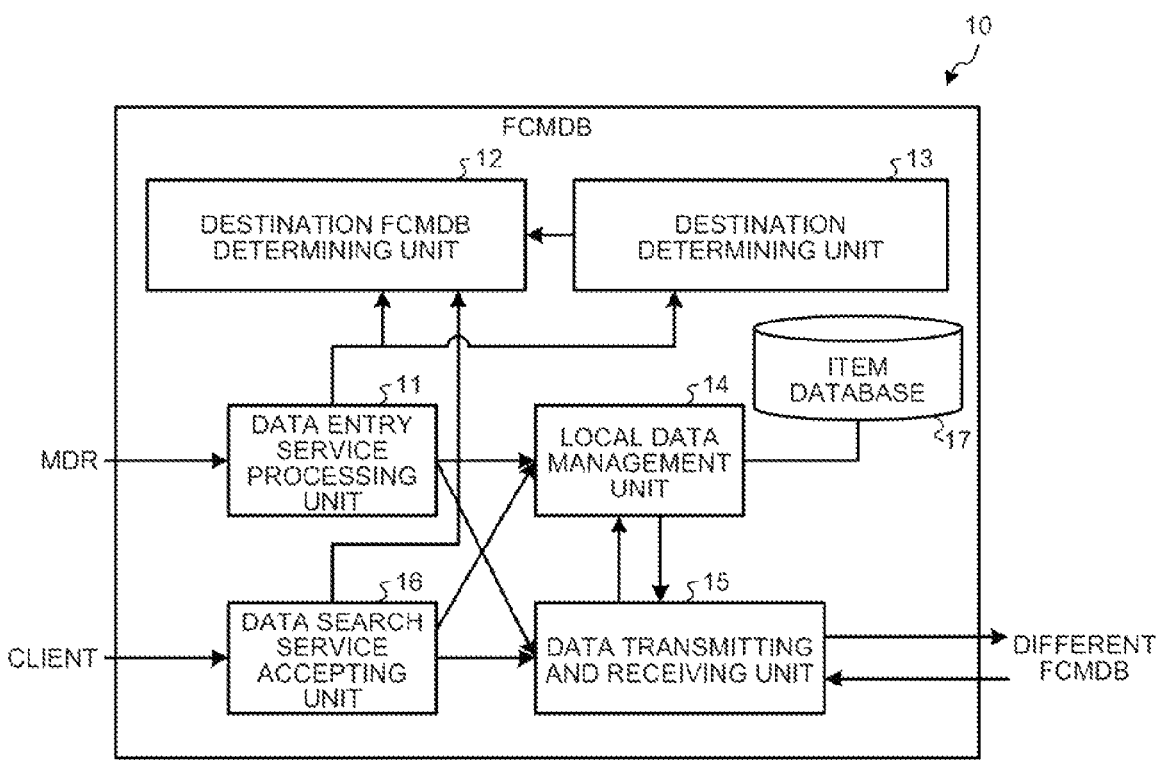
FIG. 2 is a block diagram illustrating the structure of an FCMDB according to a second embodiment.

The structure of an FCMDB will be described next by using FIG. 2. FIG. 2 is a block diagram illustrating the structure of an FCMDB according to a second embodiment. As illustrated in FIG. 2, an FCMDB 10 includes: a data entry service processing unit 11; a destination FCMDB determining unit 12 for determining a destination FCMDB to store a CI or a relationship; a destination determining unit 13 for determining a destination to store a replica of a relationship; a local data management unit 14; a data transmitting and receiving unit 15 between FCMDBs; a data search service accepting unit 16; and an item database 17. These constituting units are connected through a network to a client terminal, an MDR, and a different FCMDB. The operations of these units are described next.

Figures 4, 5:
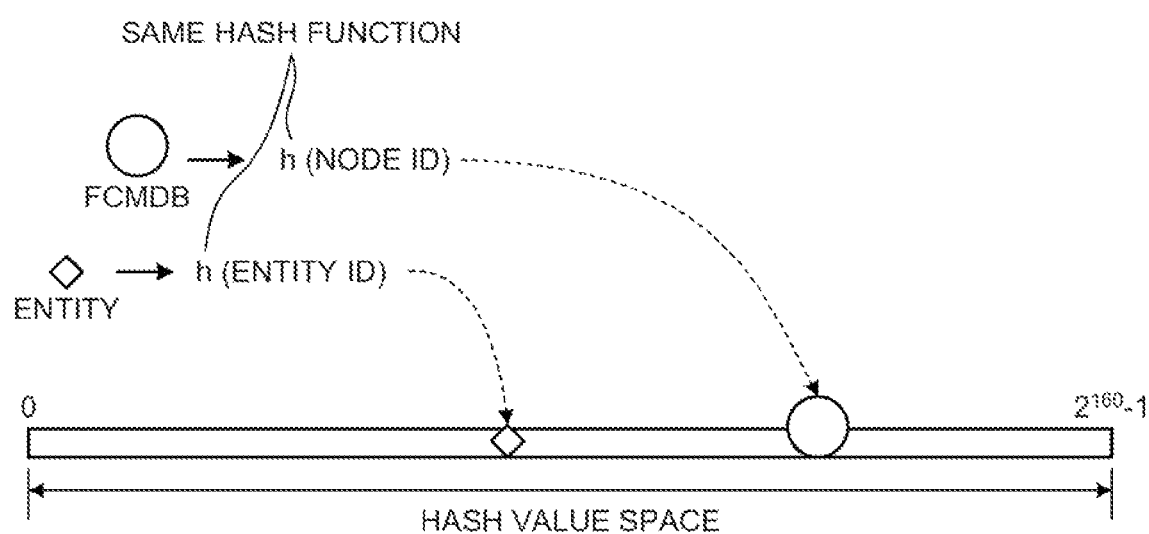
FIG. 4 is a diagram illustrating exemplary data of a relationship.
FIG. 5 is a diagram illustrating how a hash value is obtained in a data entry process.

The item database 17 stores a CI indicative of information about a target of management, and a relationship indicative of information about a connection between CIs. Exemplary data of a CI and a relationship are described below by using FIGS. 3 and 4. FIG. 3 is a diagram illustrating exemplary data of a CI. FIG. 4 is a diagram illustrating exemplary data of a relationship. As seen from the example illustrated in FIG. 3, the item database 17 contains information about a server as a CI including "item id" for uniquely identifying the configuration item, "type" indicative of the type of the configuration item, "record type" indicative of a record type of the configuration item, "name" indicative of the name of the configuration item, and "cpu" indicative of the name of a CPU.

The item database 17 also contains information about a server including "memory" indicative of the volume of a memory, "ipAddress" indicative of an IP address, and "status" indicative of the status of a configuration item. The item database 17 also contains information about a server including "organization" indicative of the name of an organization to which a configuration item belongs, "tel" indicative of a telephone number, and "email" indicative of an e-mail address.

As seen from the example illustrated in FIG. 4, the item database 17 contains information about a relationship including "relationship id" for uniquely identifying a relationship, and "sourceItem" and "targetItem" indicative of CIs to which the relationship is connected. The item database 17 also contains information about a relationship including "record type" indicative of a record type of a relationship, and "status" indicative of the status of the relationship.

When a request to enter a relationship is accepted, the data entry service processing unit 11 causes the destination FCMDB determining unit 12 described later to determine a destination to store the relationship. Then, the data entry service processing unit 11 controls to cause the item database 17 or a different FCMDB to store the relationship.

More specifically, when a request to enter a CI or a relationship given from the MDR is accepted, the data entry service processing unit 11 instructs the destination FCMDB determining unit 12 to determine a destination FCMDB. When notified of a destination FCMDB from the destination FCMDB determining unit 12, the data entry service processing unit 11 determines whether the destination is the FCMDB to which the data entry service processing unit 11 belongs. If the destination is the FCMDB to which the data entry service processing unit 11 belongs, the data entry service processing unit 11 stores the CI or the relationship into the item database 17. If the destination is a different FCMDB, the data entry service processing unit 11 instructs the data transmitting and receiving unit 15 to transfer the CI or the relationship to the different FCMDB.

Next, the data entry service processing unit 11 determines whether the data, the request for entry of which has been accepted, is a relationship. If the data, the request for entry of which has been accepted, is a relationship, the data entry service processing unit 11 instructs the destination determining unit 13 to determine a destination FCMDB to store a replica of the relationship.

When notified of the destination FCMDB from the destination determining unit 13, the data entry service processing unit 11 instructs the data transmitting and receiving unit 15 to transfer the replica of the relationship to a different FCMDB.

When a request to enter a CI or a relationship is accepted, the destination FCMDB determining unit 12 determines a destination to store the relationship. More specifically, when instructed by the data entry service processing unit 11 to determine a destination FCMDB, the destination FCMDB determining unit 12 obtains a hash value by using a hash function, thereby determining a destination FCMDB.

Figure 6:
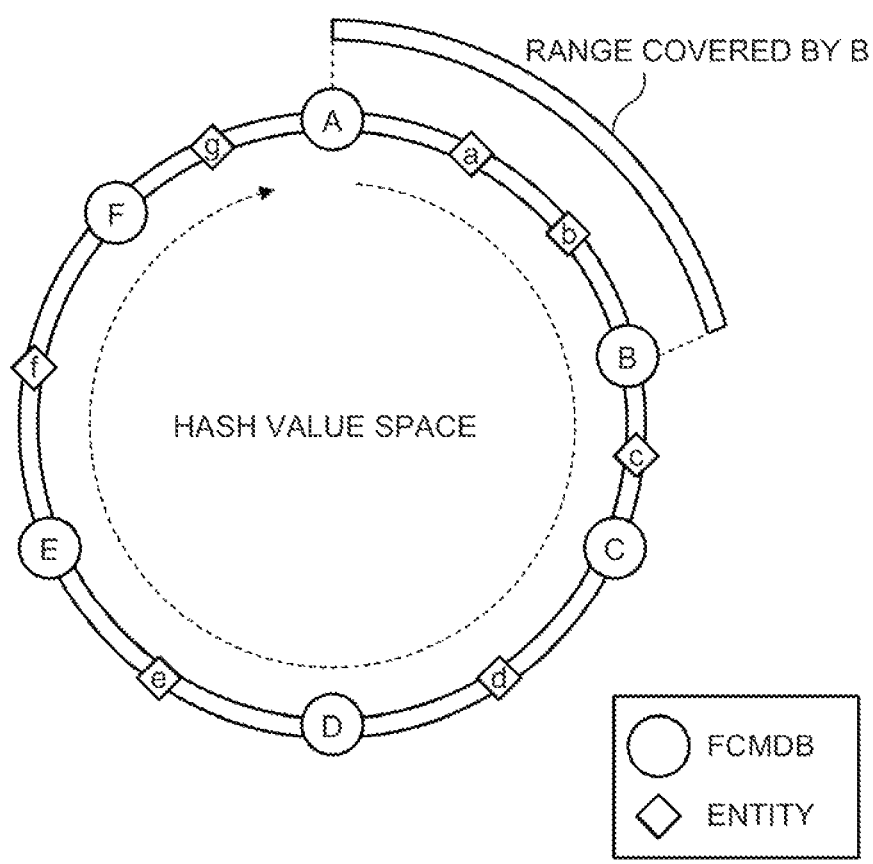
FIG. 6 is a diagram illustrating how data are distributed in the data entry process.

An exemplary process for determining a destination FCMDB is described next by using FIGS. 5 and 6. FIG. 5 is a diagram illustrating how a hash value is obtained in a data entry process. FIG. 6 is a diagram illustrating how data are distributed in the data entry process. In the description given below, a CI and a relationship are called "entities" where appropriate.

As seen from the example illustrated in FIG. 5, an FCMDB maps FCMDBs and entities into space within the same range of hash value by using the same hash function. As an example, as illustrated in FIG. 5, the FCMDB obtains a hash value of an entity by using a hash function and an entity ID, and maps the entity into hash value space (from 0 to 2160-1). The FCMDB also obtains a hash value of each FCMDB by using a hash function and an FCMDB ID (node ID), and maps the FCMDB into the hash value space (from 0 to 2160-1).

As illustrated in FIG. 6, the hash value space is in the form of a ring the start and the end of which are linked together. An FCMDB manages an entity mapped in a position between the FCMDB itself and an FCMDB mapped just before the FCMDB in the clockwise direction. In the example illustrated in FIG. 6, entities "a" and "b" are mapped in positions within a range to be covered by an FCMDB "B," and are managed by the FCMDB "B" accordingly. The aforementioned process for determining a destination FCMDB is illustrated as an example only. Another process may be applied as long as a destination FCMDB is uniquely determined.

Figure 7:
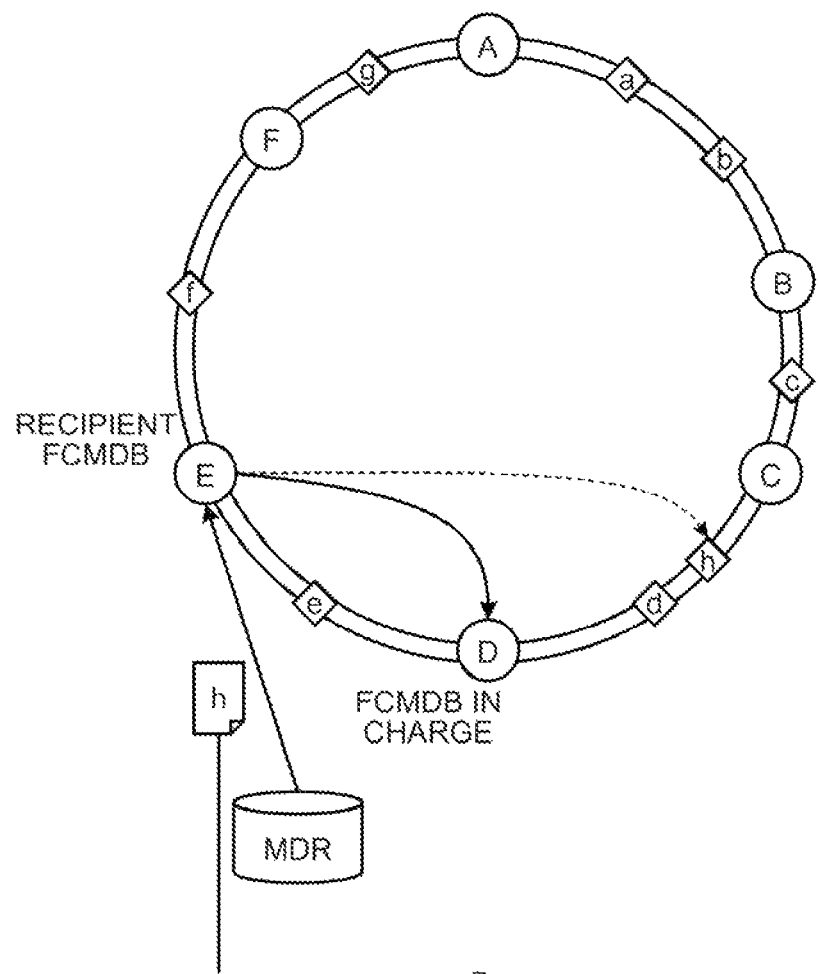
FIG. 7 is a diagram illustrating an overall flow of the data entry process.

The overall flow of the data entry process will be described next by using FIG. 7. FIG. 7 is a diagram illustrating an overall flow of the data entry process. As illustrated in FIG. 7, the MDR transmits entity data to any FCMDB (in the example of FIG. 7, FCMDB "E").

The FCMDB having accepted the entity data performs a reconcile process to obtain an entity ID. Then, the FCMDB having accepted the entity data obtains a hash value by using a hash function and the entity ID, and transfers the entity data to an FCMDB in charge (in the example of FIG. 7, FCMDB "D"). The reconcile process mentioned here is a process for identifying a CI managed by a different local ID.

The FCMDB in charge receives the entity data, and stores the received entity data to the item database 17. If the FCMDB in charge already received the same entity data from a different FCMDB, the FCMDB in charge integrates the received entity data.

Referring back to FIG. 2, the destination determining unit 13 controls to cause the item database 17 or a different configuration information management device, in either of which a CI connected to a relationship is stored, to store a replica of the relationship. More specifically, the destination determining unit 13 is instructed by the data entry service processing unit 11 to determine a destination FCMDB to store a replica of a relationship. In response, the destination determining unit 13 extracts "sourceItem" and "targetItem" from the data of the relationship that are indicative of CIs to which the relationship is connected.

Next, the destination determining unit 13 uses the entity IDs of extracted "sourceItem" and "targetItem" to specify FCMDBs in which the CIs connected to the relationship are stored. Then, the destination determining unit 13 notifies the specified FCMDBs as those to store the replica of the relationship to the data entry service processing unit 11.

Figure 8:
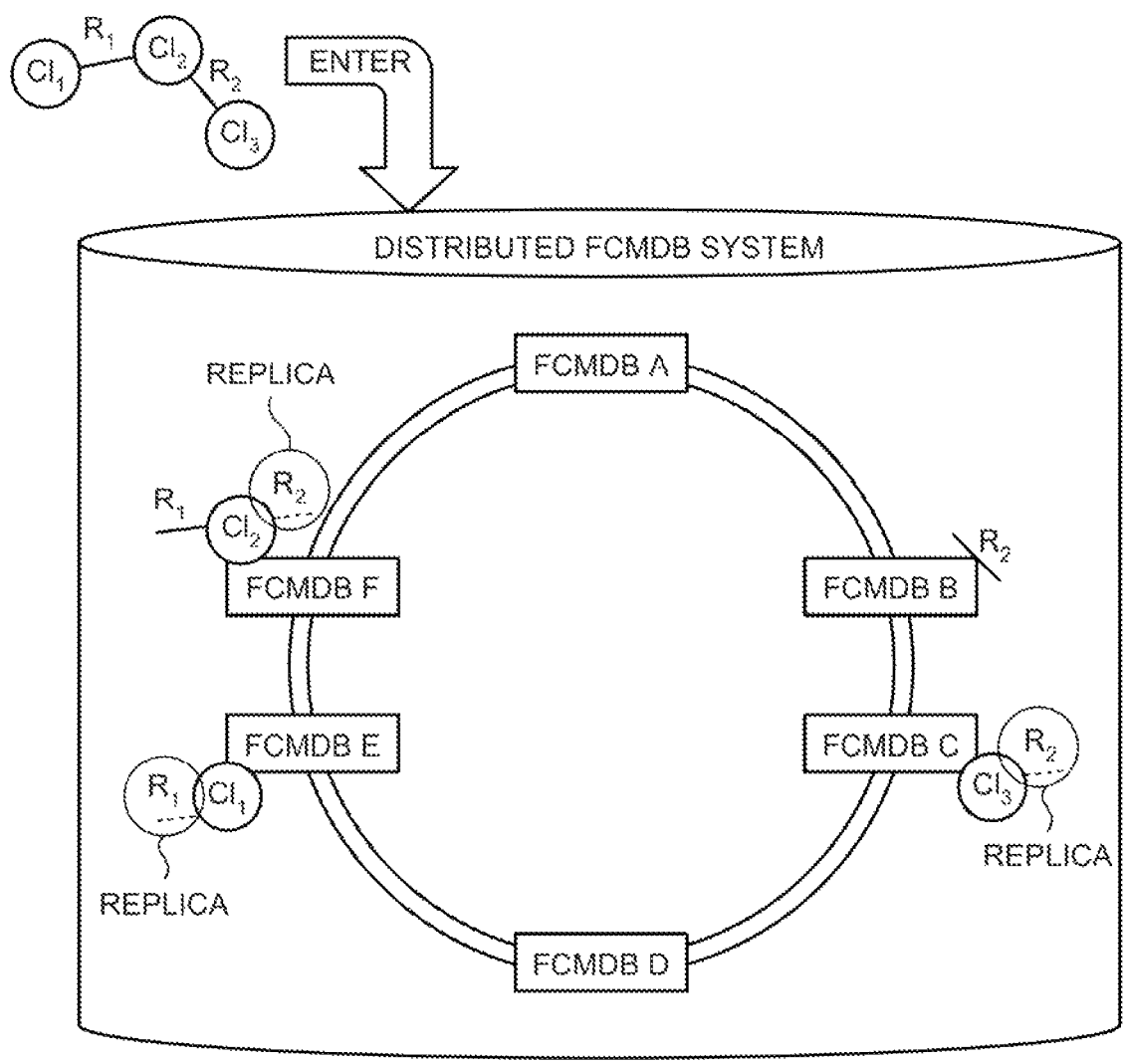
FIG. 8 is a diagram illustrating how replicas of relationships are arranged.

As illustrated in the example of FIG. 8, in order to enter a relationship "$R_2$," an FCMDB having accepted a request for entry determines that FCMDBs "F" and "C" are those where "$CI_2$" and "$CI_3$" connected to the relationship "$R_2$" are stored respectively. Then, the FCMDB having accepted the request transmits a replica of the relationship "$R_2$" to the FCMDBs "F" and "C," and causes the FCMDBs "F" and "C" to store the received replica.

Regarding the local data management unit 14, when a relationship from a different FCMDB is received, the local data management unit 14 controls to cause the item database 17 to store the relationship. More specifically, when the data transmitting and receiving unit 15 receives the data of a relationship from a different FCMDB, the local data management unit 14 controls to cause the item database 17 to store the received data of the relationship.

The data transmitting and receiving unit 15 transmits a replica of a relationship caused to be stored by the local data management unit 14 to a different FCMDB in which a CI connected to the relationship is stored. More specifically, when instructed by the data entry service processing unit 11 to transmit a CI or a replica of a relationship to a different destination FCMDB, the data transmitting and receiving unit 15 transmits the data of the CI or the relationship to the different destination FCMDB.

When a relationship from a different FCMDB is received, the data transmitting and receiving unit 15 controls to cause the item database 17 to store the received relationship. More specifically, when data of a relationship is received from a different FCMDB, the data transmitting and receiving unit 15 notifies the local data management unit 14 of receipt of the data. Then, the local data management unit 14 causes the item database 17 to store the received data.

When a subquery is received from the data search service accepting unit 16 described later, the data transmitting and receiving unit 15 broadcasts the received subquery to different FCMDBs. When results of the subquery from the different FCMDBs are accepted, the data transmitting and receiving unit 15 notifies the data search service accepting unit 16 of receipt of the results.

When a search request including a series of a CI and a relationship is accepted, the data search service accepting unit 16 decomposes the search request such that the CI and the relationship arranged in series are together treated as a subquery, and performs a search process for each subquery. More specifically, the data search service accepting unit 16 accepts a search request from a client terminal to search for a CI or a relationship. In response, the data search service accepting unit 16 decomposes the search request such that a CI and a relationship arranged in series are together treated as a subquery.

Figure 9:
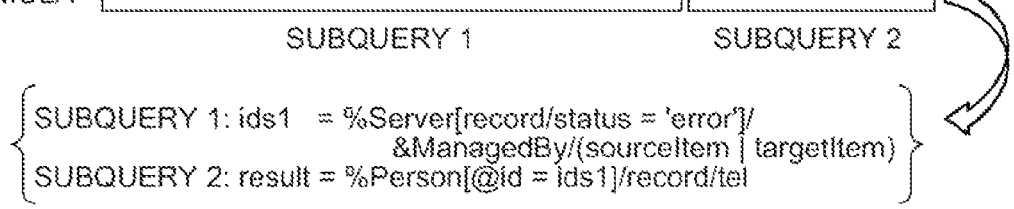
FIG. 9 is a diagram illustrating an exemplary query formula and exemplary decomposition into subqueries.

Then, as illustrated in the example of FIG. 9, the FCMDB 10 decomposes the search request into a subquery 1 "%Server[record/status='error']/&ManagedBy/," and a subquery 2 "%Person/record/tel." A result of a query may be reflected in a subsequent query. Accordingly, in the example of FIG. 9, the subquery 1 is changed to "%Server[record/status='error']/&ManagedBy/(sourceItem|targetItem)." A broken-down server (expressed as "%Server[record/status='error']"), and the ID of a CI (expressed as "&ManagedBy") managed by the broken-down server are obtained by the subquery 1 as changed. A result of the subquery 1 as changed is called ids1. The result of the subquery 1 may be reflected in the subquery 2. Accordingly, the subquery 2 is expressed as "%Person/[@id=ids1]/record/tel." The subquery 2 contains "ids1" that is the result ids1 of the subquery 1. The subquery 2 determines the telephone number of an administrator coinciding with any one of IDs obtained by the subquery 1. The telephone number thereby determined is a final result of the query formula in its entirety.

Accordingly, as illustrated in the example of FIG. 9, the FCMDB 10 decomposes the search request into the subquery 1 "%Server[record/status='error']/&ManagedBy/," and the subquery 2 "%Person/record/tel." In the example of FIG. 9, the ids1 as a result of the subquery 1 is expressed as "%Server[record/status='error']/&ManagedBy/(sourceItem|targetItem)." A final result of the query formula in its entirety is expressed as "%Person/[@id=ids1]/record/tel."

That is, the FCMDB 10 stores the data of a relationship related to a CI as well as the data of the CI. Accordingly, the FCMDB 10 is capable of processing a CI and a relationship arranged in series in a query formula as one subquery (in the aforementioned example, as the subquery 1). A CI and a relationship arranged in series in a query formula are expressed as "%CI/&Relationship," "&Relationship/%CI," or "&Relationship/%CI/&Relationship."

After decomposing the search request into the subqueries, the FCMDB 10 having accepted the search request specifies an FCMDB targeted for the search by using the subqueries thereby formed, and transmits the subqueries to the specified FCMDB. If an FCMDB targeted for the search cannot be specified, the FCMDB 10 having accepted the search request broadcasts the subqueries to different FCMDBs, combines results of the search from the different FCMDBs, and outputs a final result of the query formula in its entirety to the client terminal.

Figure 10:
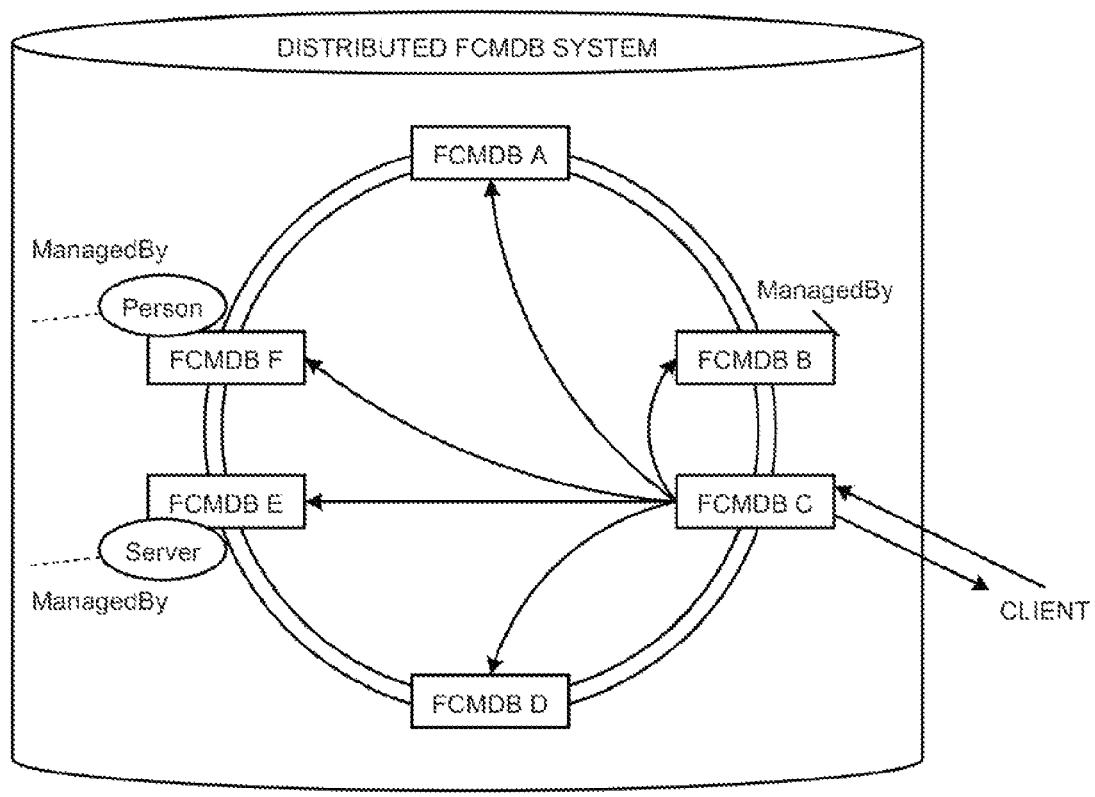
FIG. 10 is a diagram illustrating a data search process.

A search process realized by broadcasting subqueries to different FCMDBs will be described next by using FIG. 10. FIG. 10 is a diagram illustrating a data search process. As illustrated in FIG. 10, after accepting a search request, an FCMDB "C" decomposes a query formula into subqueries 1 and 2, and broadcasts the subquery 1 to different FCMDBs.

All the FCMDBs including the FCMDB "C" execute the subquery 1, and send their respective results to the FCMDB "C." Next, the FCMDB "C" combines the results of the subquery 1, incorporates the combined result into the subquery 2, and broadcasts the subquery 2 to the different FCMDBs. Then, all the FCMDBs including the FCMDB "C" execute the subquery 2, and send their respective results to the FCMDB "C." The FCMDB "C" thereafter combines the results of the subquery 2, and sends the combined result to the client terminal.

That is, in a distributed FCMDB system according to the second embodiment, a replica of a relationship is placed in an FCMDB in which a CI connected to the relationship is stored. Thus, a CI and a relationship connected to each other are retrieved from that single FCMDB in the search process, so that a processing speed in the search process is increased.

Processing by FCMDB

Figure 11:
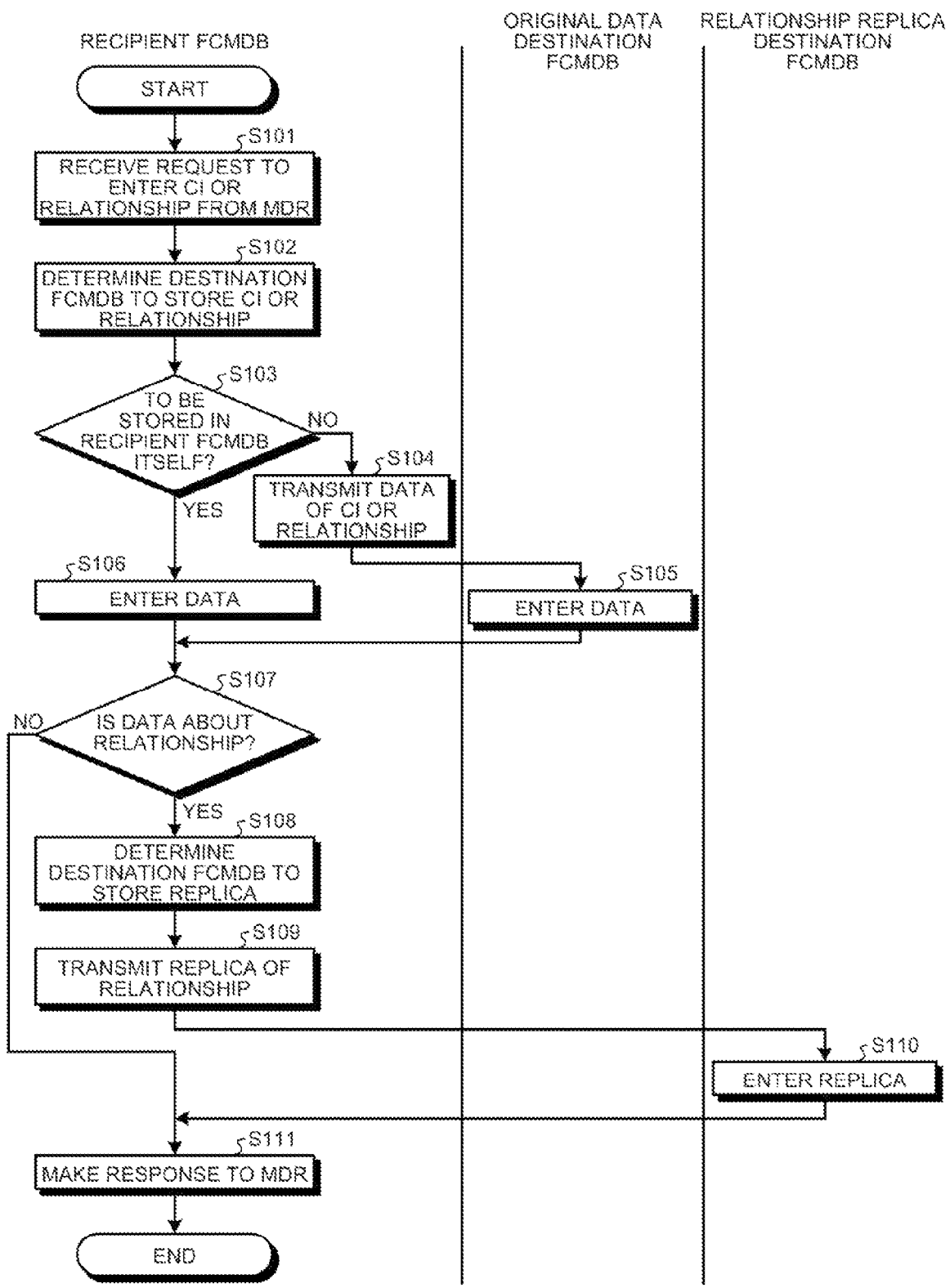
FIG. 11 is a flow diagram illustrating a procedure of an entry process by FCMDBs according to the second embodiment.

An entry process by the distributed FCMDB system according to the second embodiment will be described next by referring to FIG. 11. FIG. 11 is a flow diagram illustrating a procedure of an entry process by FCMDBs according to the second embodiment. In the example illustrated in FIG. 11, an FCMDB having received a request to enter a CI or a relationship from an MDR is called a recipient FCMDB. An FCMDB determined as an FCMDB to store the CI or the relationship received from the MDR is called an original data destination FCMDB. An FCMDB determined as an FCMDB to store a replica of the relationship received from the MDR is called a relationship replica destination FCMDB.

As illustrated in FIG. 11, the data entry service processing unit 11 accepts a request to enter a CI or a relationship from the MDR (step S101). When the request to enter the CI or the relationship is accepted, the destination FCMDB determining unit 12 determines a destination FCMDB to store the CI or the relationship (step S102).

Next, the data entry service processing unit 11 determines whether the destination is the FCMDB to which the data entry service processing unit 11 belongs (step S103). If the destination is the FCMDB to which the data entry service processing unit 11 belongs (Yes of step S103), the data entry service processing unit 11 stores the CI or the relationship into the item database 17 (step S106). If the destination is not the FCMDB to which the data entry service processing unit 11 belongs (No of step S103), the data transmitting and receiving unit 15 transmits the data of the CI or the relationship to a different destination FCMDB (step S104).

The original data destination FCMDB receives the data of the CI or the relationship, and enters the received data into an item database of the original data destination FCMDB itself (step S105). Next, the data entry service processing unit 11 of the recipient FCMDB determines whether the data is about the relationship (step S107). If the data is not about the relationship (No of step S107), the data entry service processing unit 11 of the recipient CMDB makes a response to the MDR to notify the MDR of completion of the entry (step S111).

If the data is about the relationship (Yes of step S107), the destination determining unit 13 determines an FCMDB to store a replica of the relationship (step S108). More specifically, the destination determining unit 13 determines FCMDBs, in which "sourceItem" and "targetItem" indicative of CIs connected to the relationship are stored, as those to store a replica of the relationship.

Next, the data transmitting and receiving unit 15 transmits the data of the relationship to the relationship replica destination FCMDBs (step S109). Then, the replica of the relationship is entered into the relationship replica destination FCMDBs (step S110). The data entry service processing unit 11 of the recipient FCMDB thereafter makes a response to the MDR to notify the MDR of completion of the entry (step S111).

Figure 12:
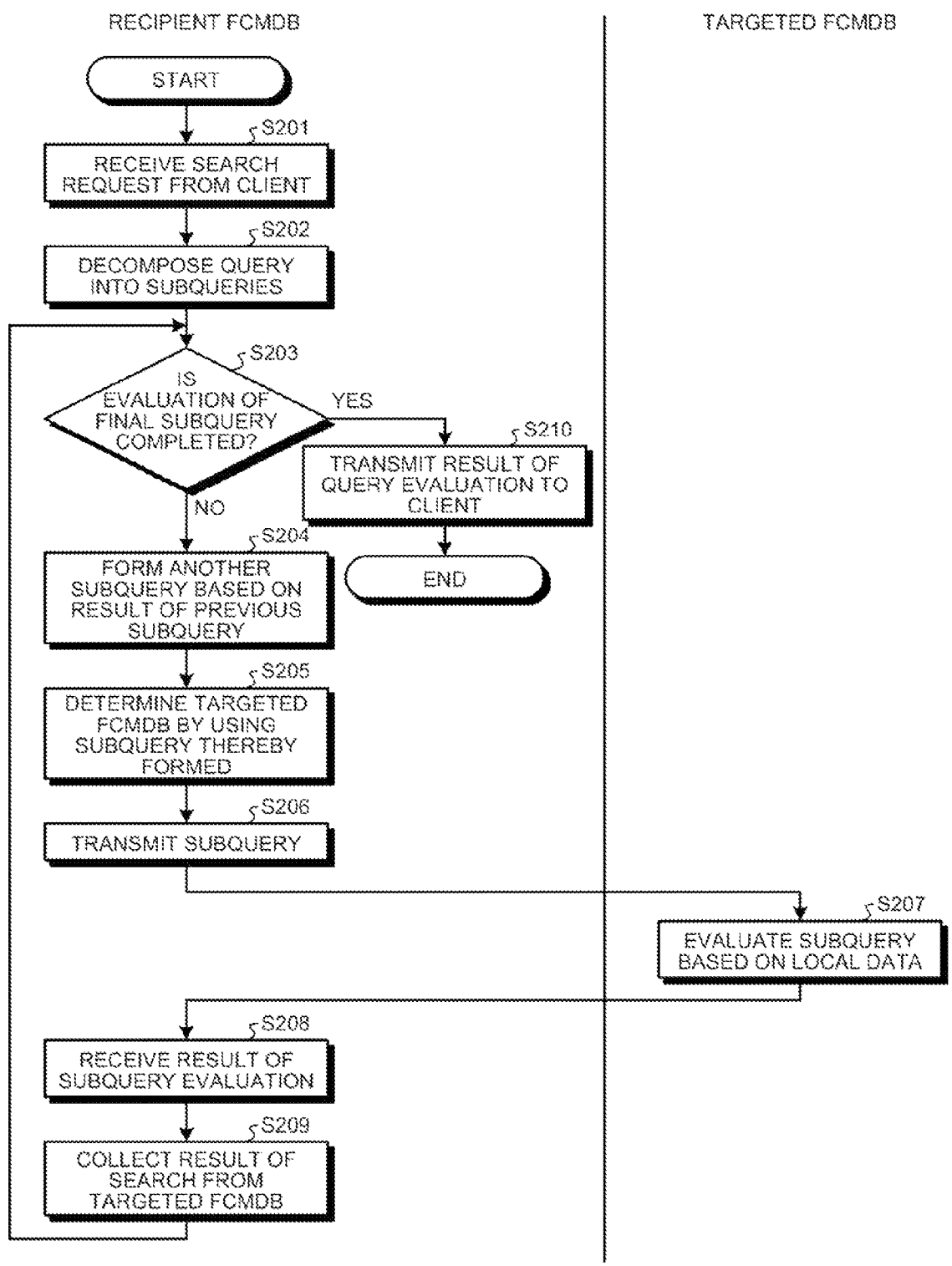
FIG. 12 is a flow diagram illustrating a procedure of a search process by the FCMDBs according to the second embodiment.

The search process by the distributed FCMDB system of the second embodiment will be described next by using FIG. 12. FIG. 12 is a flow diagram illustrating a procedure of a search process by the FCMDBs according to the second embodiment. In the example illustrated in FIG. 12, an FCMDB having received a request to search a CI or a relationship from a client terminal is called a recipient FCMDB. An FCMDB determined as an FCMDB targeted for the search is called a targeted FCMDB.

As illustrated in FIG. 12, when a search request from a client terminal is accepted (step S201), the data search service accepting unit 16 of the recipient FCMDB decomposes the search request such that a CI and a relationship arranged in series are together treated as a subquery (step S202). Then, the data search service accepting unit 16 determines whether evaluation of a final subquery is completed (step S203). If the evaluation of the final subquery is not completed, the data search service accepting unit 16 forms another subquery on the basis of a result of a previous subquery (step S204).

Next, the data search service accepting unit 16 determines a targeted FCMDB by using the subquery thereby formed (step S205), and transmits the subquery to the targeted FCMDB (step S206). If a targeted FCMDB is not specified, the data search service accepting unit 16 broadcasts the subquery to all FCMDBs as described above (see FIG. 10).

The targeted FCMDB having received the subquery evaluates the subquery on the basis of local data stored in the targeted FCMDB itself (step S207), and transmits a result of the subquery evaluation to the recipient FCMDB (step S208). The recipient FCMDB thereafter collects the result of the subquery evaluation from the targeted FCMDB as a result of the search (step S209). Then, the flow returns to step S203. In step S203, the recipient FCMDB determines whether evaluation of a final subquery is completed. If the evaluation of the final subquery is completed, the recipient FCMDB transmits the result of the query evaluation to the client terminal (step S210).

Effect of Second Embodiment

As described above, the FCMDB 10 includes the item database 17 that stores a configuration item indicative of information about a target of management, and an item relationship indicative of information about a connection between configuration items independently of a different configuration information management device. When a request to enter an item relationship is accepted, the FCMDB 10 determines a destination to store the item relationship, and controls to cause the item database 17 or the different configuration information management device to store the item relationship. Then, the FCMDB 10 controls to cause the item database 17 or the different configuration information management device, either of which contains a configuration item connected to the item relationship caused to be stored, to store a replica of the item relationship. When a search request including a series of a configuration item and an item relationship is accepted, the FCMDB 10 decomposes the search request such that the configuration item and the item relationship arranged in series are together treated as a unit of processing, and performs a search process for each unit of processing. That is, the FCMDB 10 places a replica of an item relationship in an FCMDB in which a CI connected to the item relationship is stored. Thus, a configuration item and an item relationship connected to each other are retrieved from that single FCMDB in the search process. Thus, the number of communications between FCMDBs is reduced, thereby increasing a processing speed in a search process.

In the second embodiment, when a request to enter a relationship is accepted, the FCMDB 10 extracts the IDs of a source CI and a target CI from the relationship that are indicative of CIs connected to the relationship. Then, by using the IDs of the source CI and the target CI, the FCMDB 10 specifies CIs in which the CIs connected to the relationship are stored. The FCMDB 10 thereafter controls to cause the item database 17 or different FCMDBs, in either of which the CIs are stored, to store a replica of the relationship. Accordingly, by using "sourceItem" and "targetItem" that are information originally contained in a relationship, the FCMDB 10 is capable of appropriately specifying FCMDBs in which CIs connected to the relationship are stored.

In the second embodiment, when a request to enter a relationship is accepted, the FCMDB 10 determines a destination to store the relationship by using an entity ID for uniquely identifying the relationship. Thus, the destination to store the relationship is easily determined.

[c] Third Embodiment

Various different embodiments of the invention may be devised in addition to the aforementioned first and second embodiments. A third embodiment as one of other embodiments of the invention will be described below.

(1) System Structure and Others

The constituting parts in the devices illustrated in the drawings are functionally conceptual parts, and the physical structures thereof are not necessarily limited to those illustrated in the drawings. More specifically, the details of distribution and integration of the devices are not limited to those illustrated in the drawings. Part of or all of the devices may functionally and physically be distributed or integrated in any units according to various burdens, condition of use and the like. As an example, the data entry service processing unit 11 and the destination FCMDB determining unit 12 may be integrated.

(2) Program

Figure 13:
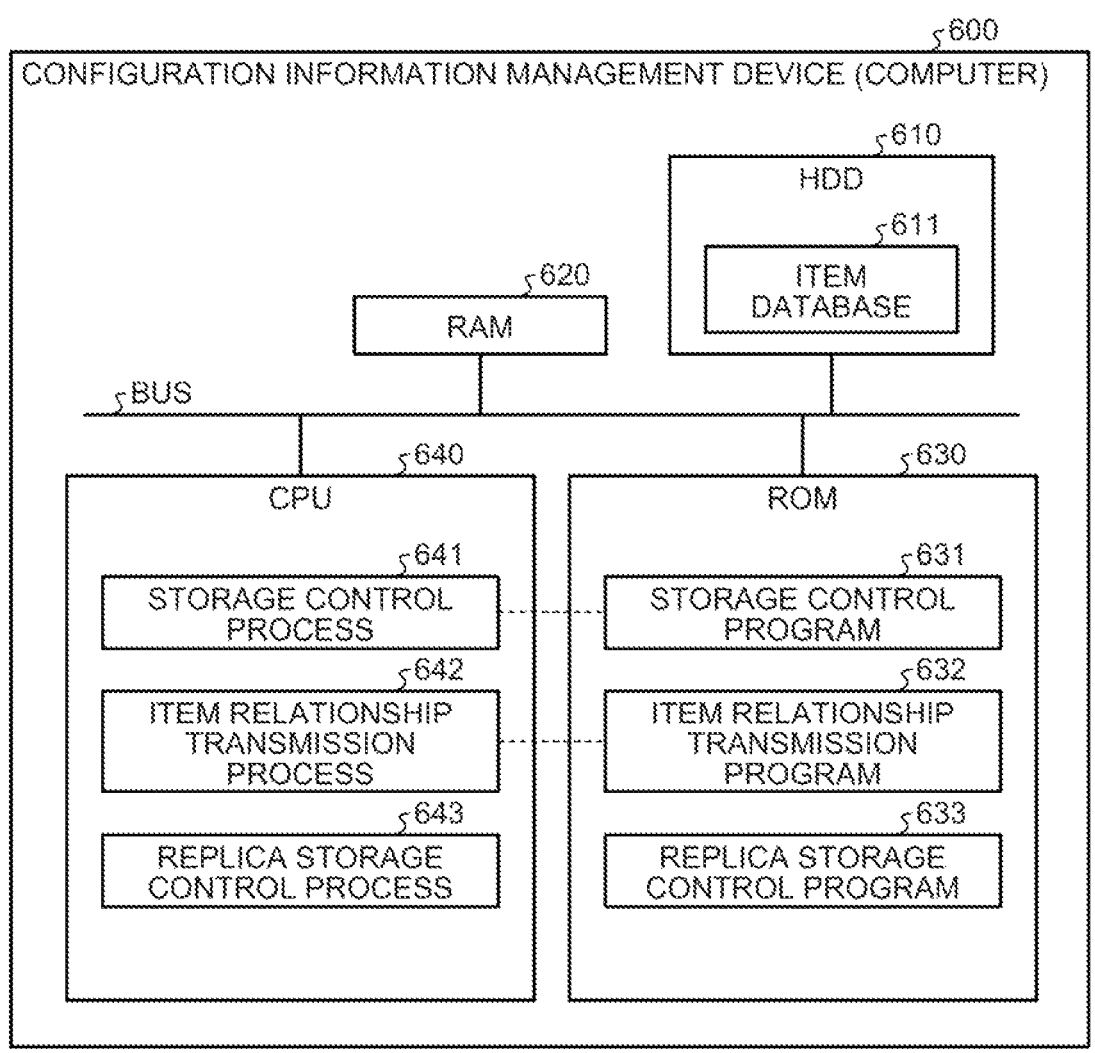
FIG. 13 is a diagram illustrating a computer that executes a distributed information management program.
Figure 14:
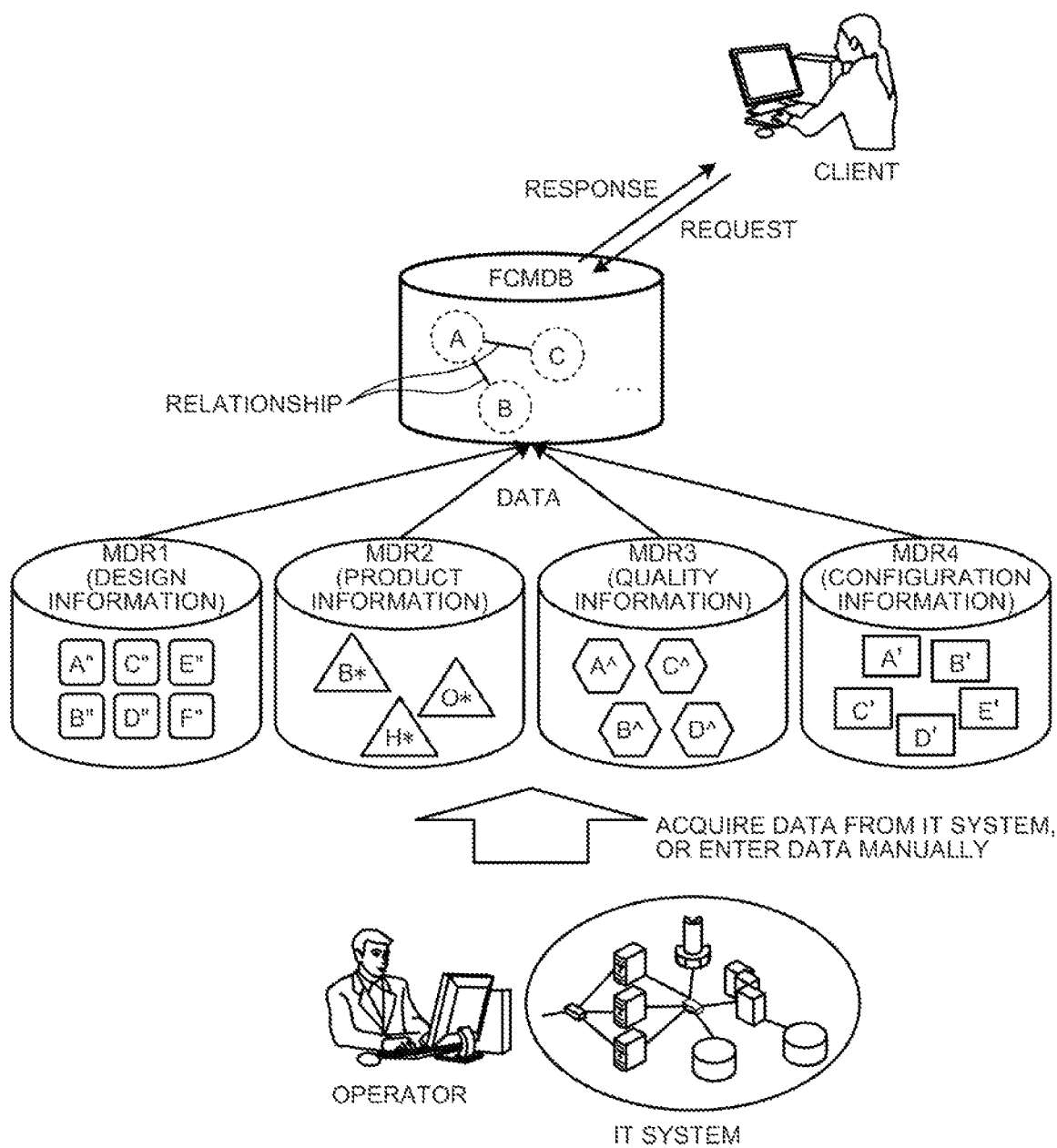
FIG. 14 is a diagram illustrating virtual integration in an FCMDB.
Figure 15:
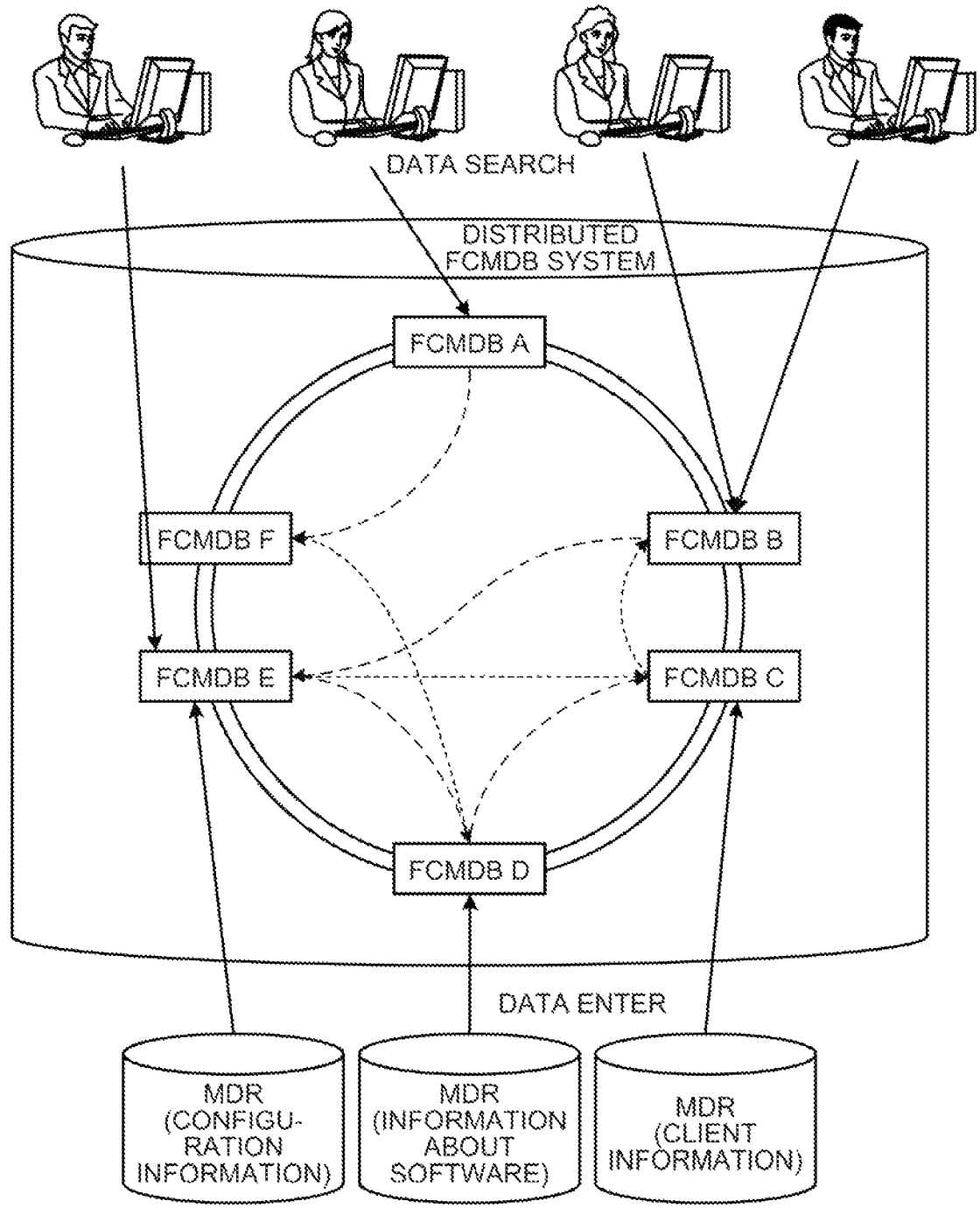
FIG. 15 is a diagram illustrating a distributed FCMDB system.
Figure 16:
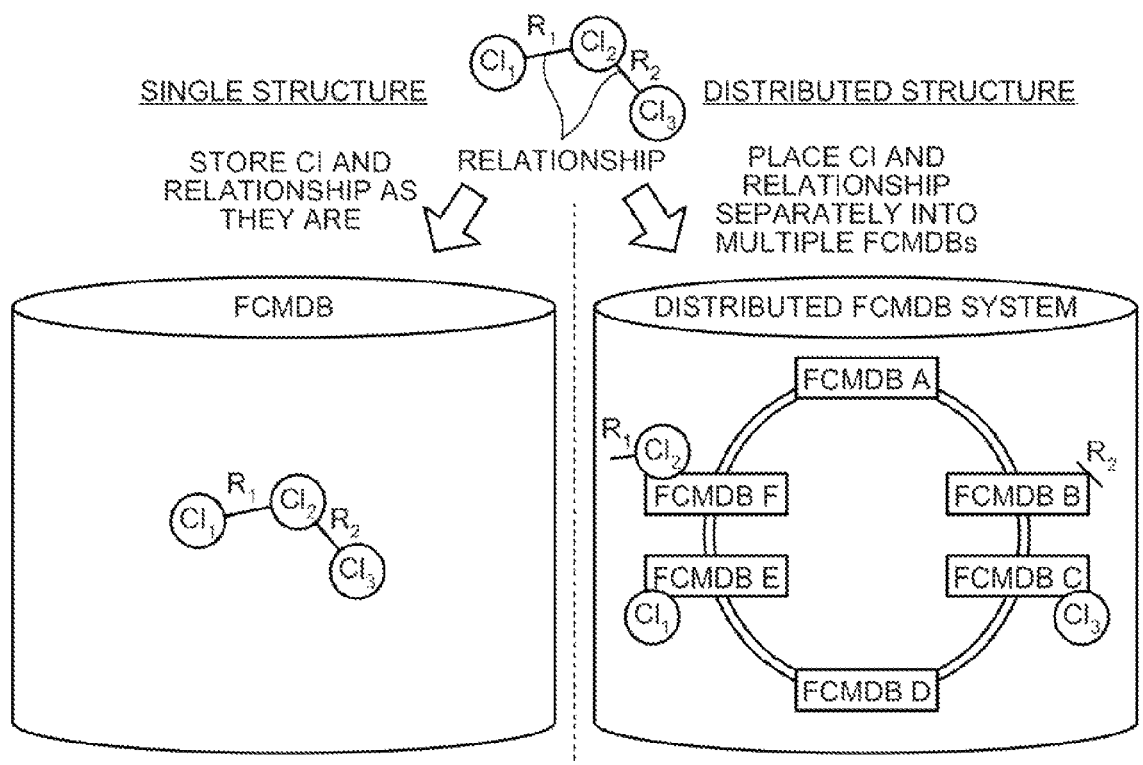
FIG. 16 is a diagram illustrating conventional data entry.
Figure 17:
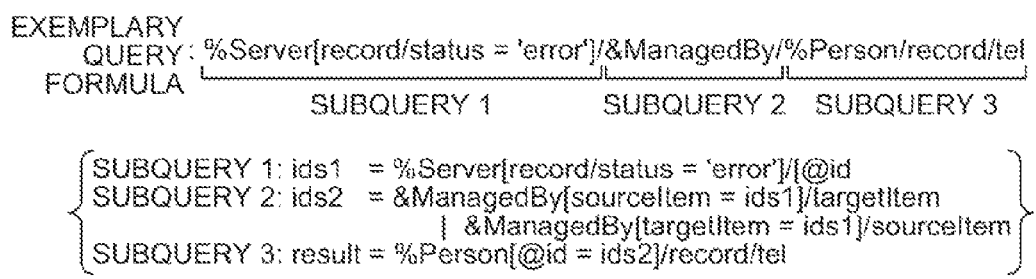
FIG. 17 is a diagram illustrating conventional data search.

The foregoing processes as described with regard to the aforementioned embodiments can be realized by causing a computer to execute a previously prepared program. In the below, an example of a computer that executes a program having the same functions as those in the aforementioned embodiments will be described by using FIG. 13. FIG. 13 is a diagram illustrating a computer that executes a distributed information management program.

As illustrated in FIG. 13, a computer 600 functioning as a configuration information management device includes a HDD 610, a RAM 620, a ROM 630, and a CPU 640 that are connected to each other through a bus 650.

Distributed information management programs having the same functions as those of the aforementioned embodiments, namely a storage control program 631, an item relationship transmission program 632, and a replica storage control program 633 illustrated in FIG. 13 are stored in advance in the ROM 630. Like the constituting parts of the FCMDB 10 illustrated in FIG. 2, the programs 631 to 633 may be integrated or distributed, where appropriate.

The CPU 640 reads the programs 631 to 633 from the ROM 630 and executes the read programs, by which the programs 631 to 633 become operative to realize a storage control process 641, an item relationship transmission process 642, and a replica storage control process 643, respectively.

An item database 611 is provided in the HDD 610 as illustrated in FIG. 13. The CPU 640 enters data into the item database 611. The CPU 640 also transfers data from the item database 611 to the RAM 620, and then performs a process based on the data stored in the RAM 620.

The programs 631 to 633 are not necessarily to be initially stored in the ROM 630. For example, each program can be stored in a "portable physical medium", for example, a flexible disk (FD), a compact disk read only memory (CD-ROM), a digital versatile disk (DVD), an optical disk, an integrated circuit (IC) card, and the like. The computer 600 can be configured to read the each program from those, and to execute it.

Furthermore, each program can be stored in "another computer (or a server)" that is connected to the computer 600 via a public line, the Internet, a local area network (LAN), a wide area network (WAN), or the like. The computer 600 can be configured to read the each program from those, and to execute it.

According to one aspect of each of the configuration information management device, the distributed information management system, the distributed information management method, and the distributed information management program of the invention, a processing speed in a search process is increased.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A configuration information management device, comprising:

a configuration information storage unit distributedly storing a configuration item indicative of information about a target of management, and an item relationship indicative of information about a connection between configuration items independently of a different configuration information management device;

a storage controlling unit, when a request to enter the item relationship, is accepted, determining a destination to store the item relationship, and controlling to cause the configuration information storage unit or the different configuration information management device to store the item relationship;

a replica storage controlling unit for controlling to cause the configuration information storage unit or the different configuration information management device to store a replica of the item relationship caused to be stored by the storage controlling unit, either the configuration information storage unit or the different configuration information management device containing a configuration item connected to the item relationship; and a search processing unit, when a search request including a series of the configuration item and the item relationship is accepted, decomposing the search request such that the configuration item and the item relationship arranged in series are together treated as a unit of processing, and performing a search process for each unit of processing by specifying, using the unit of processing obtained by decomposing, one of the configuration management devices in which the configuration item and the item relationship connected to each other are stored as a target of search.

2. The configuration information management device according to claim 1, wherein, when a request to enter the item relationship is accepted, the replica storage controlling unit extracts source configuration item information and target configuration item information from the item relationship that are indicative of configuration items connected to the item relationship, specifies identifiers of the configuration items connected to the item relationship by using the source configuration item information and the target configuration item information, and controls to cause the configuration information storage unit or the different configuration information management device, in either of which the configuration items are stored, to store a replica of the item relationship.

3. The configuration information management device according to claim 1, wherein, when a request to enter the item relationship is accepted, the storage controlling unit determines a destination to store the item relationship by using an identifier for uniquely identifying the item relationship.

4. A distributed information management system for distributedly storing configuration items indicative of information about a target of management, and item relationships indicative of information about connections between the configuration items separately in a plurality of configuration information management devices, the configuration information management device comprising:

a configuration information storage unit distributedly storing the configuration item and the item relationship independently of a different one of the configuration information management devices;

a storage controlling unit, when a request to enter the item relationship is accepted, determining a destination to store the item relationship, and controlling to cause the configuration information storage unit or the different configuration information management device to store the item relationship;

a replica storage controlling unit controlling to cause the configuration information storage unit or the different configuration information management device to store a replica of the item relationship caused to be stored by the storage controlling unit, either the configuration information storage unit or the different configuration information management device containing a configuration item connected to the item relationship; and a search processing unit, when a search request including a series of the configuration item and the item relationship is accepted, decomposing the search request such that the configuration item and the item relationship arranged in series are together treated as a unit of processing, and performing a search process for each unit of processing by specifying, using the unit of processing obtained by decomposing, one of the configuration management devices in which the configuration item and the item relationship connected to each other are stored as a target of search.

5. A distributed information management method, comprising:

determining a destination to store the item relationship, when a request to enter an item relationship indicative of information about a connection between configuration items is accepted, and controlling to cause a configuration information storage unit of a configuration information management device or a different configuration information management device to store the item relationship, the configuration information storage unit distributedly storing the configuration item and the item relationship independently of the different configuration information management device;

controlling to cause the configuration information storage unit or the different configuration information management device to store a replica of the item relationship caused to be stored, either the configuration information storage unit or the different configuration information management device containing a configuration item connected to the item relationship; and decomposing, when a search request including a series of the configuration item and the item relationship is accepted, the search request such that the configuration item and the item relationship arranged in series are together treated as a unit of processing and performing a search process for each unit of processing by specifying, using the unit of processing obtained by decomposing, one of the configuration management devices in which the configuration item and the item relationship connected to each other are stored as a target of search.

6. A computer readable, non-transitory medium having stored therein a distributed information management program causing a computer to execute a process comprising:

determining a destination to store the item relationship, when a request to enter an item relationship indicative of information about a connection between configuration items is accepted, and controlling to cause a configuration information storage unit of a configuration information management device or a different configuration information management device to store the item relationship, the configuration information storage unit storing the configuration item and the item relationship independently of the different configuration information management device;

controlling to cause the configuration information storage unit or the different configuration information management device to store a replica of the item relationship caused to be stored, either the configuration information storage unit or the different configuration information management device containing a configuration item connected to the item relationship; and decomposing, when a search request including a series of the configuration item and the item relationship is accepted, the search request such that the configuration item and the item relationship arranged in series are together treated as a unit of processing and performing a search process for each unit of processing by specifying, using the unit of processing obtained by decomposing, one of the configuration management devices in which the configuration item and the item relationship connected to each other are stored as a target of search.

7. A configuration information management device, comprising:
 a processor; and
 a memory, wherein the processor executes:
  determining a destination to store the item relationship, when a request to enter an item relationship indicative of information about a connection between configuration items is accepted, and controlling to cause the memory of the configuration information management device or a different configuration information management device to store the item relationship, the memory storing the configuration item and the item relationship independently of the different configuration information management device;
  controlling to cause the memory or the different configuration information management device to store a replica of the item relationship caused to be stored, either the memory or the different configuration information management device containing a configuration item connected to the item relationship; and
  decomposing, when a search request including a series of the configuration item and the item relationship is accepted, the search request such that the configuration item and the item relationship arranged in series are together treated as a unit of processing and performing a search process for each unit of processing by specifying, using the unit of processing obtained by decomposing, one of the configuration management devices in which the configuration item and the item relationship connected to each other are stored as a target of search.

* * * * *